United States Patent [19]
Valley et al.

[11] Patent Number: 5,331,642
[45] Date of Patent: Jul. 19, 1994

[54] MANAGEMENT OF FDDI PHYSICAL LINK ERRORS

[75] Inventors: Stephen R. Valley, Valatie; Jeffrey R. Warren, Kingston, both of N.Y.

[73] Assignee: International Business Machines Corporation, Armonk, N.Y.

[21] Appl. No.: 938,785

[22] Filed: Sep. 1, 1992

[51] Int. Cl.$^5$ ............................................. G06F 11/16
[52] U.S. Cl. ..................................... 371/5.2; 371/5.1; 371/8.2
[58] Field of Search .................. 371/5.1, 5.2, 8.2, 11.2, 371/20.1, 28; 364/222.2, 241.9, 242.95, 265.1, 266; 395/200

[56] References Cited
U.S. PATENT DOCUMENTS

| | | |
|---|---|---|
| 4,641,309 | 2/1987 | Nakano et al. . |
| 4,847,837 | 6/1989 | Morales et al. ........................ 371/8 |
| 4,939,736 | 7/1990 | Kocan . |
| 4,996,698 | 2/1991 | Nelson . |
| 5,023,942 | 6/1991 | Goepel . |
| 5,034,940 | 7/1991 | Saito et al. . |
| 5,276,703 | 1/1994 | Budin et al. ............................ 375/1 |

*Primary Examiner*—Vincent P. Canney
*Attorney, Agent, or Firm*—Lawrence D. Cutter

[57] ABSTRACT

An LAN management facility for monitoring and managing errors on the physical links connecting the stations of a LAN. The facility includes, in part, an Enhanced Link Error Monitor (LEM). The Enhanced LEM continuously determines a Link Error Rate (LER) estimate as a function of time based upon the errors seen on the physical links. The enhanced LEM applies a link specific characteristic function to the LER estimate in order to determine an Adjusted LER Estimate. The link specific characteristic function takes into account the particular characteristics of the link experiencing the errors and is used to alter the station's responsiveness to these errors. The Adjusted LER Estimate is compared to alarm and cutoff thresholds in order to determine the appropriate action to take with respect to the link. By altering the link specific characteristic function, the Enhanced LEM will either become more or less responsive to errors on the link, thereby tolerating more or less errors in a greater or lesser period of time. In a preferred embodiment of invention, each station on the LAN maintains a Management Information Base (MIB) which contains the link specific characteristic function. The attributes in the MIB, including the link specific characteristic function, can be altered remotely by a LAN manager through one of the LAN stations acting as a proxy agent.

16 Claims, 7 Drawing Sheets

MANAGEMENT OF FDDI PHYSICAL LINK ERRORS

FIELD OF THE INVENTION

The present invention relates generally to Local Area Networks and more particularly to the management of physical link errors in such a network.

BACKGROUND OF THE INVENTION

A Local Area Network (LAN) is a communication network which interconnects several computer or data terminals. Each of the computers or other devices is said to be located at a node or station of the network. The network allows the computers and/or terminals to communicate (receive and transmit information) with the other nodes of the LAN. Optical LANs are becoming more and more prevalent with the advent of technologies such as the Fiber Distributed Data Interface (FDDI). This technology employs fiber optics as the transmission medium, allowing transmission rates up to 100 Mbits per second.

As optical LANS become more common, the maintenance of the optical links connecting the nodes of the LAN will become increasingly important. Marginal optical links can inject undesirable errors into the data stream of a point to point communication link. While certain systems have a high tolerance for transmission media errors, many systems are unable to cope with such media difficulties. Burst errors, multiple errors within a relatively short period of time, can occur from conditions on the optical link of a fairly normal nature, such as extended marginal link quality, link degradation, or dirty connectors. Utility power grids are another source of noise which can cause bit errors in an optical link.

Unnecessary link terminations are the usual result of such noise bursts. Link termination requires the logical connection between FDDI nodes to cease, thus requiring the station to re-establish the logical connection if communication is to resume. The termination and re-establishment process can result in a significant decrease in system throughput and an increasing complex LAN management system. When the logical connection between two FDDI nodes is removed due to bursts of noise, the FDDI logical ring will be either temporarily wrapped, or a cluster of stations will be segmented. Clearly, it is desirable to avoid either of these situations. Present link management capabilities are incomplete and do not prevent these problems.

It is therefore one object of this invention to improve link management capabilities.

It is also an object of this invention to increase fault diagnostics and fault isolation capabilities while increasing system throughput.

It is another object of this invention to manage burst link errors without terminating link communications.

SUMMARY OF THE INVENTION

Description of the Preferred Embodiment

Figure 1:
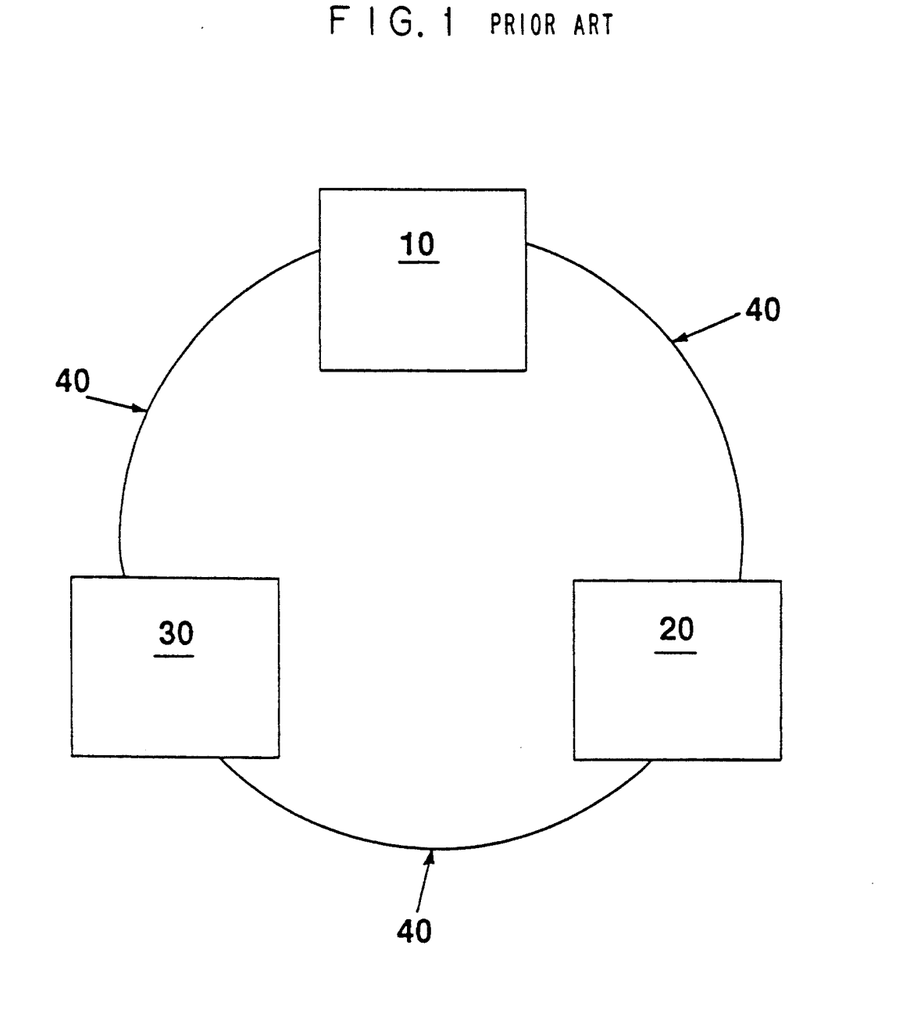
FIG. 1 depicts a generalized Local Area Network (LAN) configuration.

FIG. 1 shows a generalized depiction of a Local Area Network (LAN). This figure illustrates a LAN containing three nodes, 10-30, connected by physical links, 40. Communication between the nodes of the LAN are governed by any of the well known protocols such as TCP/IP, System Network Architecture (SNA), Local area network basic input/output system (NETBIOS), AppleTalk (trademark of Apple Corporation), Internet Packet Exchange (IPX) (trademark of Novell), Digital Equipment Corporation Network Phase IV (trademark of Digital Equipment Corp.), and Xerox Services Internet Transport (XNS) (trademark of Xerox Corporation).

The physical links, 40, could be traditional copper wire, but as is becoming more and more common, the links are constructed from optical fibers. The links are preferably governed by the FDDI/SMT standard, as defined and described by the International Organization for Standardization in documents such as draft of ISO standard 10164/4 "Structure of Management Information Part 4: Guidelines for the Definition of Managed Objects" dated 15 Jun, 1990.

The nodes, 10-30, in FIG. 1 can contain any functional unit such as a processor, a workstation, a concentrator or access unit, a router, a bridge, a printing device, a personal computer or a gateway for example. In order to support the optical fiber links, each of the nodes will contain at least one optical transmitter and one receiver. Alternatively these separate elements can be combined into one unit call a transceiver.

Figure 2:
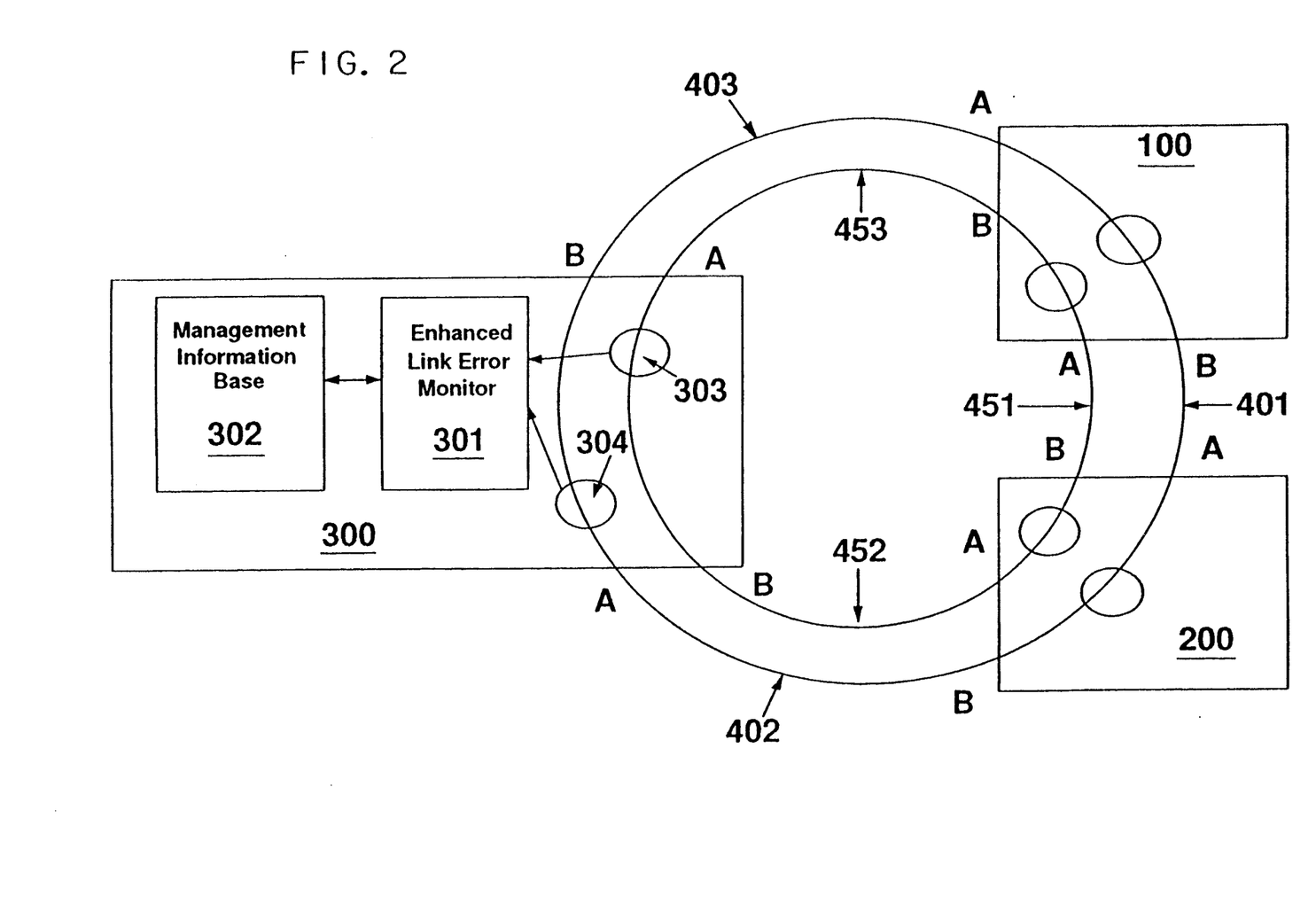
FIG. 2 is a LAN configuration incorporating the link management features of the present invention.

FIG. 2, depicts a LAN incorporating the design of the present invention. The structure of the LAN depicted in FIG. 2 is similar to that as described in the generalized LAN of FIG. 1, but in more detail with respect to the features necessary to practice the present invention. The actual physical device located in the station (e.g. a processor) has not been shown in FIG. 2, as the type of device is not particularly relevant to the link management of the present invention. The link management structure and method of the present invention is the same regardless of whether the station contains a printer or processor or workstation or any other type device.

As depicted in FIG. 2, each of the nodes, 100, 200 and 300, is connected to its neighboring nodes by two fiber optic links, thereby providing bidirectional communication between the nodes. For example, node 100 is connected to node 200 by links 401 and 451. Link 401 will provide communication from node 100 to node 200, while link 451 will allow node 200 to communicate with node 100.

Each of the links is attached to the station at what is called a port. The ports are labeled A and B in FIG. 2. Each of the nodes will contain two ports for the bidirectional communication with each of its two neighbors. Each of the fiber cables connected to a port contains two strains of glass fiber. The port will support the two strains of fiber with a single optical connector. Within this single optical connector the two strains of fiber will be connected respectively to a transmitter and a receiver. Therefore in the preferred embodiment of the invention, there will be two ports and four optical connections in each station (two transmit and two receive connections). Links 401, 402 and 403 in FIG. 2 provide what is essentially a circular communication path travelling in a clockwise direction between the nodes 100, 200 and 300. Conversely, links 451–453 provide a counterclockwise path for communication between the nodes.

Station 300 in FIG. 2 has been expanded to illustrate some of the features of the present invention. Each of the other stations in the network (100 and 200) have similar features although not specifically illustrated in this figure. One of the keys to the link management facility is the enhanced Link Error Monitor (LEM), 301. The LEM is the central location in a station for the management of link errors experienced by the station. The enhanced LEM is depicted in more detail in FIG. 3 and will be discussed in more detail with respect to that figure. One of the inputs to the LEM is an indication of when one of the links to the station experiences an actual error. This input is originated from the detectors 303 and 304. The detectors can be considered part of the LEM since their primary function is to provide input to the LEM proper. The detectors are typically hardware monitors positioned in the receivers of the nodes and typically detect link errors by loss of light, incorrect bit sequences in a received data stream or bad Frame Checking Sequence (FCS) for example. These errors are typically the result of marginal link quality, link degradation or the plugging or unplugging of the port connector. The detectors will output an indication of an error to the LEM. This indication will usually take the form of an interrupt to the processor servicing the receiver card or an increasing error count in a register designed to keep track of the errors. The interrupt servicing routine will log the frequency, time and the link upon which the error occurred.

The other inputs to the LEM depicted in FIG. 2, come from the Management Information Base (MIB), 302. The MIB contains various information and station attributes required to control the station's communication via the LAN such as the station's connection policy and management entities. The MIB also contains station/link specific information which is also input into the LEM as depicted in FIG. 2.

Figure 3:
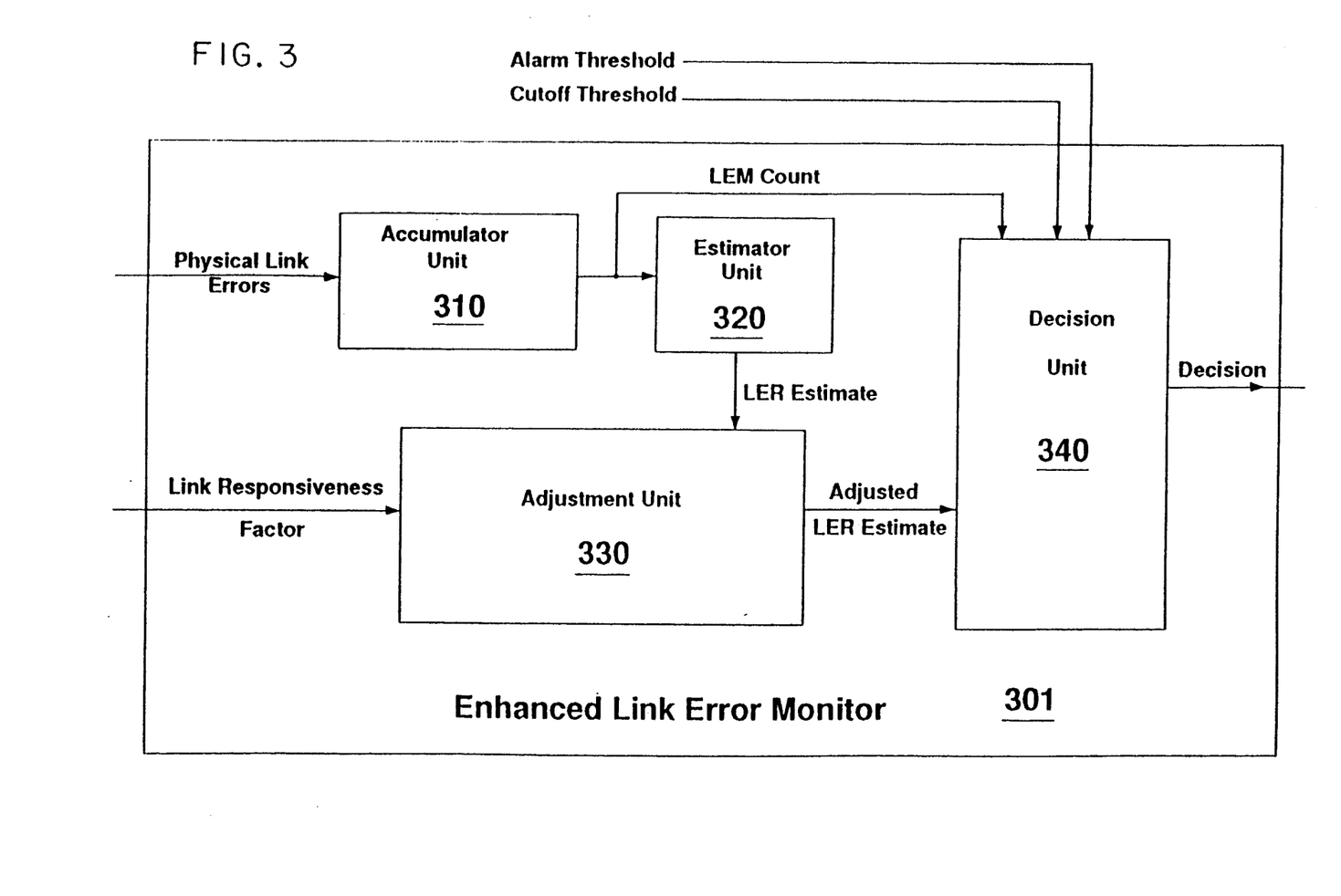
FIG. 3 is a functional block diagram of the Enhanced Link Error Monitor of the present invention.

The enhanced LEM of the present invention is depicted in greater detail in FIG. 3. As can be seen in this figure, the inputs to the enhanced LEM are an Alarm Threshold, a Cutoff Threshold, the Link Responsiveness Factor (LRF) and the Physical Link Errors. The first three inputs come from the MIB, 302, while the Physical Link Errors come from the detectors, 303 and 304, as previously discussed in conjunction with FIG. 2. The final output of the enhanced LEM is a decision as to what, if any, action needs to be performed with respect to the links connected to the station in light of the errors seen by the links. The various decisions and the manner in which they are arrived at will be more fully described later in this discussion. Intermediate/internal outputs of the enhanced LEM are the LEM Count and an Adjusted LER Estimate. The LEM Count is the output of the Accumulator, 310, and represents the aggregate of the link errors experienced. The LEM Count is used in both the Estimator Unit, 320, and as part of the threshold testing in the Decision Unit, 340. The Adjusted LER estimate is the estimate of the link error rate after it has been adjusted in the Adjustment Unit.

Shown in block form in this figure are the various functional units of the enhanced LEM which are of interest to the present invention. These functional units include an Accumulator Unit, 310, an Estimator Unit, 320, an Adjustment Unit, 330, for applying the LRF to the LER Estimate, and a Decision Unit, 340. The Accumulator Unit's function is to receive the link errors (from the detectors 303 and 304 in FIG. 2) and either count or time stamp the errors. The output of the Accumulator, 310, is the LEM Count as described previously. The function of the Estimator Unit, 320, is to derive a long term average link error rate estimate based upon the errors experienced by the links connected to the station. The Estimator Unit, 320, receives the aggregate link error count, LEM Count, from the Accumulator Unit, 310, and proceeds to estimate the link error rate (LER) as a function of time. The output of the Estimator Unit, 320, is called the LER Estimate.

The LER Estimate from the Estimator Unit, 320, is the primary input to the Adjustment Unit, 330. In prior art systems, the LER Estimate was directly fed to the Decision Unit, 340, for testing against the various thresholds. In the Adjustment Unit, 330, according to the present invention, the LER Estimate is adjusted in order to take into account the specific characteristics of the link being monitored. The output of the Adjustment Unit, 330, is called the Adjusted LER Estimate. The adjustment performed in the Adjustment Unit, 330, can be accomplished in a variety of ways, but in the preferred embodiment of the present invention, a Link Responsiveness Factor, LRF is applied to the LER Estimate. In one embodiment, the LRF is defined as a weighting factor in the form of a simple equation such as a constant which is used to multiply (or divide) the LER Estimate. The LRF can also be defined as a constant which is added to or subtracted from the LER Estimate. The LRF can also be defined as a complex or a series of complex equations which use the LER Estimate as its sole, or one of many inputs. The final output of this series of functions is the Adjusted LER Estimate.

Alternatively, the Adjustment Unit, 330, is defined as an algorithm or system of algorithms for adjusting the LER Estimate to take into account the link specific characteristics. This system permanently resides in memory in the Adjusting Unit, 330, and the LRF and the LER Estimate are the two primary inputs which are required to derive the Adjusted LER Estimate. The LRF can alternatively be some function which alters the permanent adjustment algorithm (e.g. adds or deletes functions which are to be applied to the LER Estimate). The effect of using the Adjustment Unit, 330, to derive the Adjusted LER Estimate can be graphically seen in FIGS. 6 and 7 and will be discussed more fully in conjunction with the description of those figures.

The Adjusted LER Estimate is directed from the Adjustment Unit, 330, to the Decision Unit, 340, for comparison to the Alarm Threshold and the Cutoff Threshold. Initially, the Adjusted LER Estimate is compared to the Alarm Threshold in order to determine if an alarm should be output to the operator of the system (or other control functions in the system). An alarm is meant to serve as an early warning to the operator, and/or other parts of the system, that the link is approaching the point where link termination is possible. The alarms can also be used to keep track of the performance of the link (for possible changes to the LRF in the future). If the Adjusted LER Estimate exceeds the Alarm Threshold, the Decision Unit, 340, proceeds to compare the Adjusted LER Estimate to the Cutoff Threshold. The Cutoff Threshold represents a level of link errors at which (as has been previously defined/determined) no further communication on the link can take place. If the Adjusted LER Estimate exceeds the Cutoff Threshold, then the Decision Unit, 340, will output a decision which says that the link connection should be terminated. This decision is forwarded to the station management entity (not shown in FIG. 3) which will perform the actual link termination. If the Adjusted LER Estimate does not exceed the Cutoff Threshold, then the Decision Unit, 340, will output the alarm as discussed previously.

Each of the functional units for the LEM depicted in FIG. 3 can either be hardware circuitry, can be implemented in software being controlled by a processor, or can be a combination of the two. In the preferred embodiment of the present invention, the detection and accumulation functions are implemented in hardware, while estimation, adjustment and decision functions are implemented by software state machines.

The present invention, via use of the LRF, provides great flexibility in the ability to tailor the link management policy to incorporate the link specific characteristics. In one embodiment of the present invention, the LRF is supplied to the LEM via the Management Information Base (MIB). The LRF resides in the MIB in space reserved for user defined attributes. In the preferred embodiment of the present invention, the LRF in the MIB can be altered remotely, by a separate management application. A system capable of performing this remote link management is depicted in FIG. 4.

Figure 4:
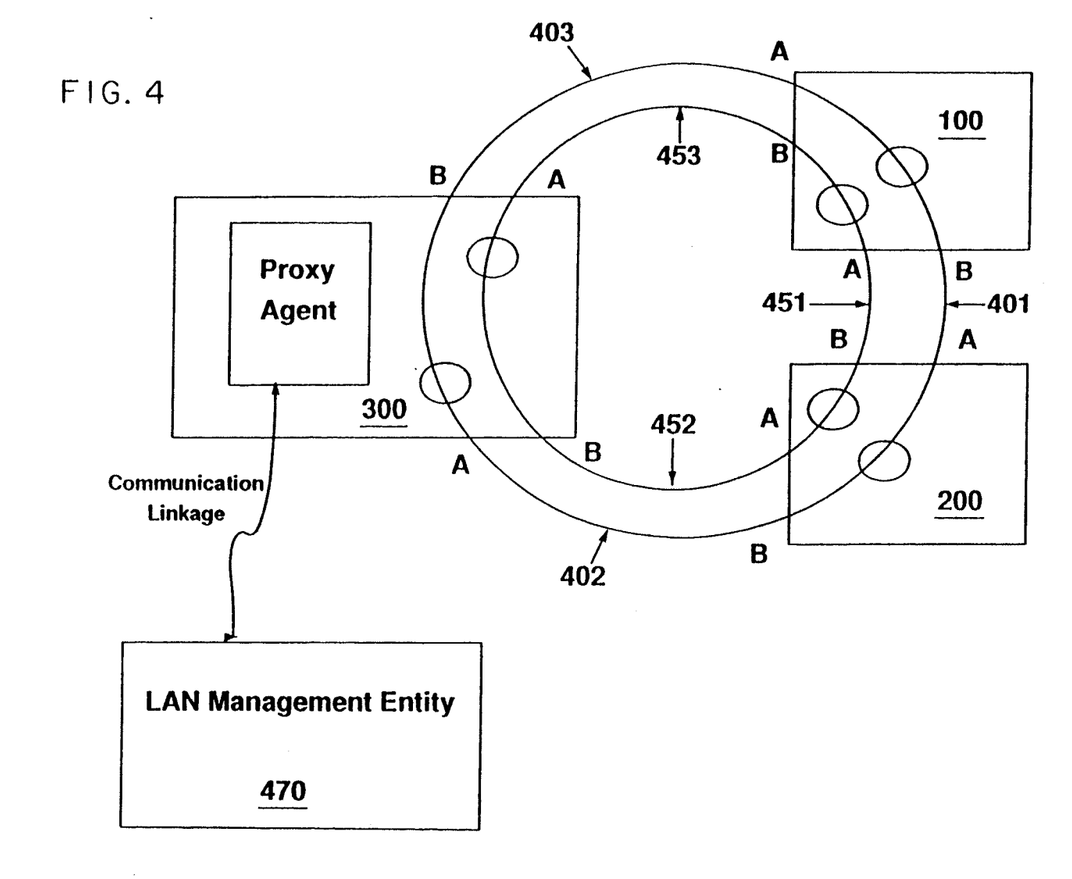
FIG. 4 illustrates a LAN whose links are remotely managed according to the present invention.

As seen in FIG. 4 a separate LAN Management Unit, 470, is provided to enable remote management of the LAN. The LAN Management Unit (or LAN Manager), 470, can receive, modify and update some of the individual station attributes contained in the MIB located at the station. The LAN Management Unit can manage some of the stations on the FDDI ring by the use of proxy agent. The proxy agent can be any one of stations connected to the LAN, but has been chosen to be station 300 in FIG. 4. The LAN Manager can modify a particular station's MIB attributes by first sending the proxy agent a management frame via SNMP or TCP (or whatever communication linkage is provided). The management frame will include the station which is updated, the specific attribute to updated and the data which reflects the change. The proxy agent, 300 in our current example, will contain a FDDI/management translator. This translator will convert the management frame from the LAN Manager into a FDDI specific SMT frame. The proxy agent will then place the FDDI frame on the ring where it will be picked up by the station which is to be altered. Once the station receives the FDDI SMT frame, it performs the requested update to the specified MIB attribute. Alternatively the LAN Manager, via the same process can directly alter the algorithms or system of algorithms which permanently resides in the Adjustment Unit, 330, in the Enhanced LEM, 301.

The process of determining how the LRF (and in turn the link connection management policy) should be altered, can be accomplished in a variety of ways. In the most straightforward implementation, an operator monitors the errors and terminations experienced on the links in the LAN and manually enters new LRFs for the stations via the LAN Manager. In a more sophisticated approach, a software application resides in the LAN Manager which is capable of receiving status information from the LAN, analyzing the respective status for each link, and from this analysis determining how the LRFs should be altered to maximize link performance. Through the proxy agent, the LAN Manager can request information relating to any of the stations on the LAN. Such information includes, for example, the LER Estimate, the Adjusted LER Estimate and the LEM Count as described previously. Given access to this type of information, the application in the LAN Manager is able to develop a complete history, over time, of the performance of each link in the LAN. With such a history in hand, the application can then proceed to determine how to adjust each individual station's LRF to maximize performance of the specific links attached to that station.

Figure 5:
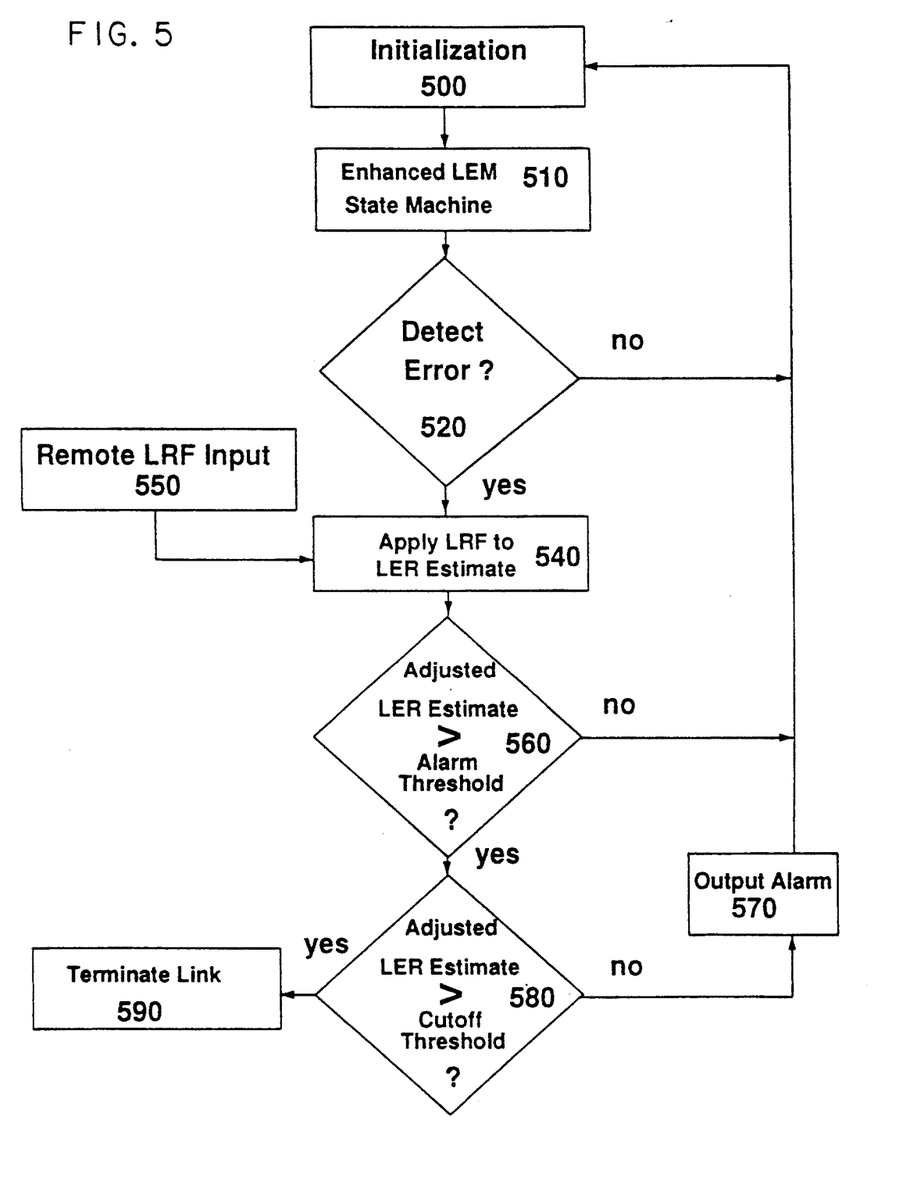
FIG. 5 is a flow chart of the process employed by the Enhanced Link Error Monitor.

Shown in FIG. 5 is a flowchart illustrating the steps of the preferred method of the present invention which is performed in the management of the links at each station. Box 500 shows the initialization of the entire station at the beginning of operations. Control of the process is then turned over to the state machine of the Enhanced LEM in box 510. The initial process within the state machine is the testing for detection of errors as seen in box 520. The errors on the links to the station are detected by the detectors 303 and 304 as seen in FIG. 2. If no errors are detected, no action is taken by the Enhanced LEM and the process continuously loops, waiting for an error. Once an error is detected, the Enhanced LEM will calculate the LER Estimate. Recall that the LER estimate is an estimate of the long term average rate of errors seen by the particular link (a function of time).

Once the Enhanced LEM has calculated the LER estimate, the Link Responsiveness Factor (LRF) is applied to the estimate as seen in box 540. The LRF is used to adjust the estimate in order to take into consideration, the characteristics of the particular link being monitored. To illustrate the use of the LRF, let us suppose that a particular link has experienced random burst errors which are very great in number, but also very short in duration. If no LRF is used, the burst errors would quickly drive the LER Estimate beyond the Alarm and Cutoff thresholds, which would result in the termination of the logical link. This in turn results in the need to reestablish the logical link. By acknowledging the repeated occurrences of burst errors on this link, and taking them into consideration via the LRF adjustment to the LER estimate, the logical link need not terminated and the resulting reestablishment is not necessary. In this particular example, the LRF might take the form of an exponential function which smooths the burst errors as a function of time. By use of the LRF, the Alarm and Cutoff thresholds will not be reached as quickly, and need for termination and reestablishment of the link is avoided. This concept will be more readily apparent in the discussion below concerning the experimental results of the present invention. As stated previously, an alternative to the LRF is the use of an algorithm or series of algorithms which reside in the Adjustment Unit, 330. Although this embodiment has not been depicted in the method of FIG. 5, it is functionally equivalent.

Once the LER Estimate has been adjusted by the LRF, the Adjusted LER Estimate is then tested against the Alarm threshold in box 560 of FIG. 5. Recall that the Alarm Threshold is a threshold value against which the adjusted LER estimate is compared to determine if an alarm should be output to the operator of the system (or other control functions in the system). If the adjusted LER estimate exceeds the alarm threshold, then the alarm is generated in box 570. The alarm is meant to serve as an early warning to the operator and/or other parts of the system that the link is approaching to the point where link termination is possible. The Alarm Threshold is user definable and is usually a constant based upon historical network data. If the Adjusted LER Estimate does not exceed the Alarm Threshold, the system goes back to the node of looking for new errors on the link in box 510.

If the Adjusted LER Estimate has exceeded the Alarm Threshold, the system proceeds to test the Adjusted LER Estimate against the Cutoff Threshold (box 580). In an alternative embodiment of this method, the system can output the alarm before the adjusted LER Estimate is compared to the Cutoff Threshold. The Cutoff Threshold is the threshold value which has been determined to be the maximum rate of errors which the station can withstand before terminating the logical link at the station. If the Cutoff Threshold has not yet been achieved, the system again goes into the process of detecting new errors on the link. But if the Cutoff Threshold has been reached, termination of the link will begin. Link termination can entail several things depending how the particular station has been configured to act in the case of severe errors. In the preferred embodiment of the present invention, link termination would include stopping all established connections involving the suspect link. Both physical and logical connections are stopped. After the connections have been stopped, a series of self diagnostic procedures are run at the station. If the self diagnostic test are passed, then reinitialization of the physical connections to the neighboring stations is attempted. Reinitialization involves, in part, running confidence tests with the neighboring stations. The confidence tests would help identify a bad link connections between the station and its neighbors. If the confidence tests do not identify a bad link, then the station will try an reconnect to the LAN (its connected neighbors) using standard connection sequences as defined by the FDDI Standard. Logical session would then have to be established by the stations which were previously communicating with the subject station.

Figure 6:
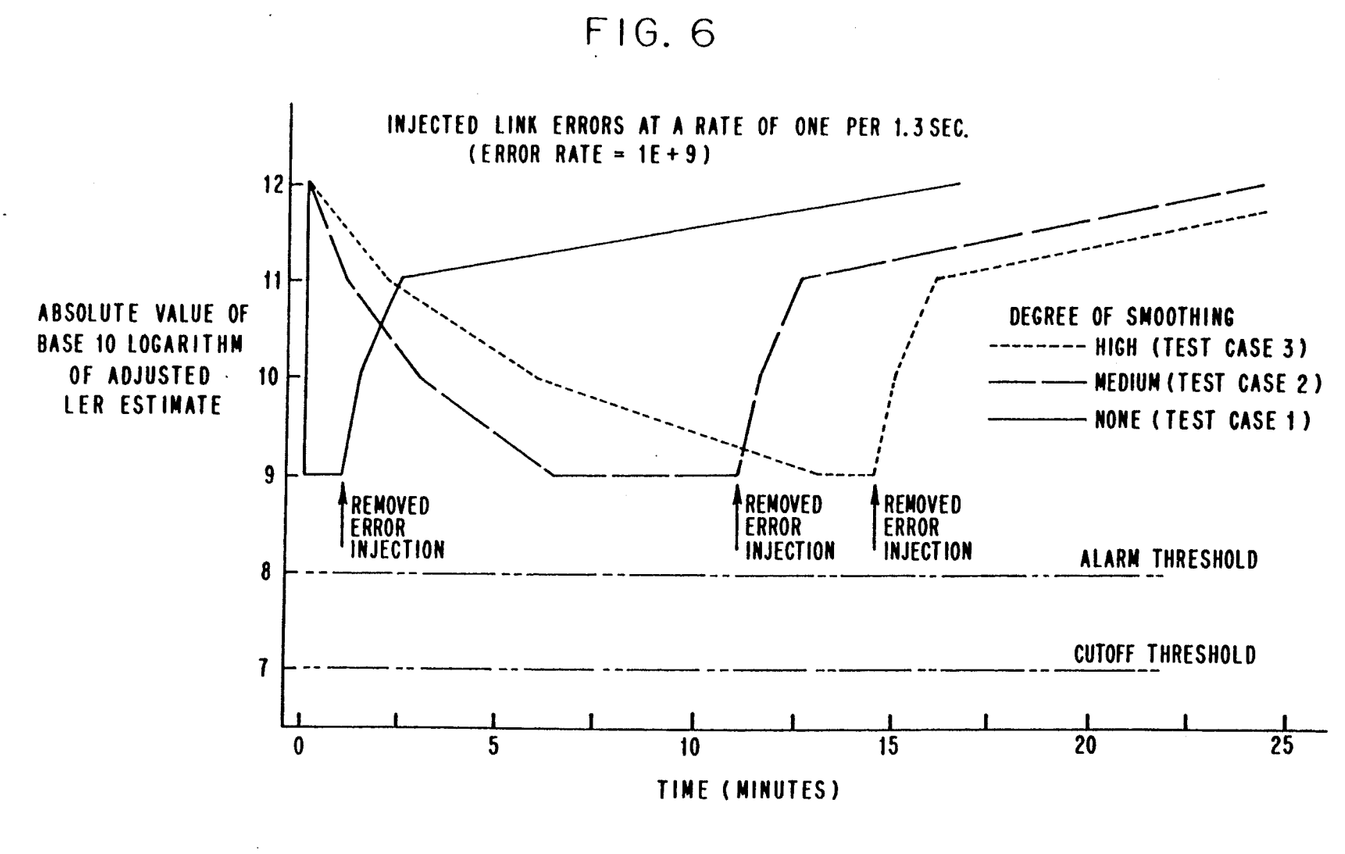
FIG. 6 is a graph of experimental results for a system experiencing a low rate of errors.
Figure 7:
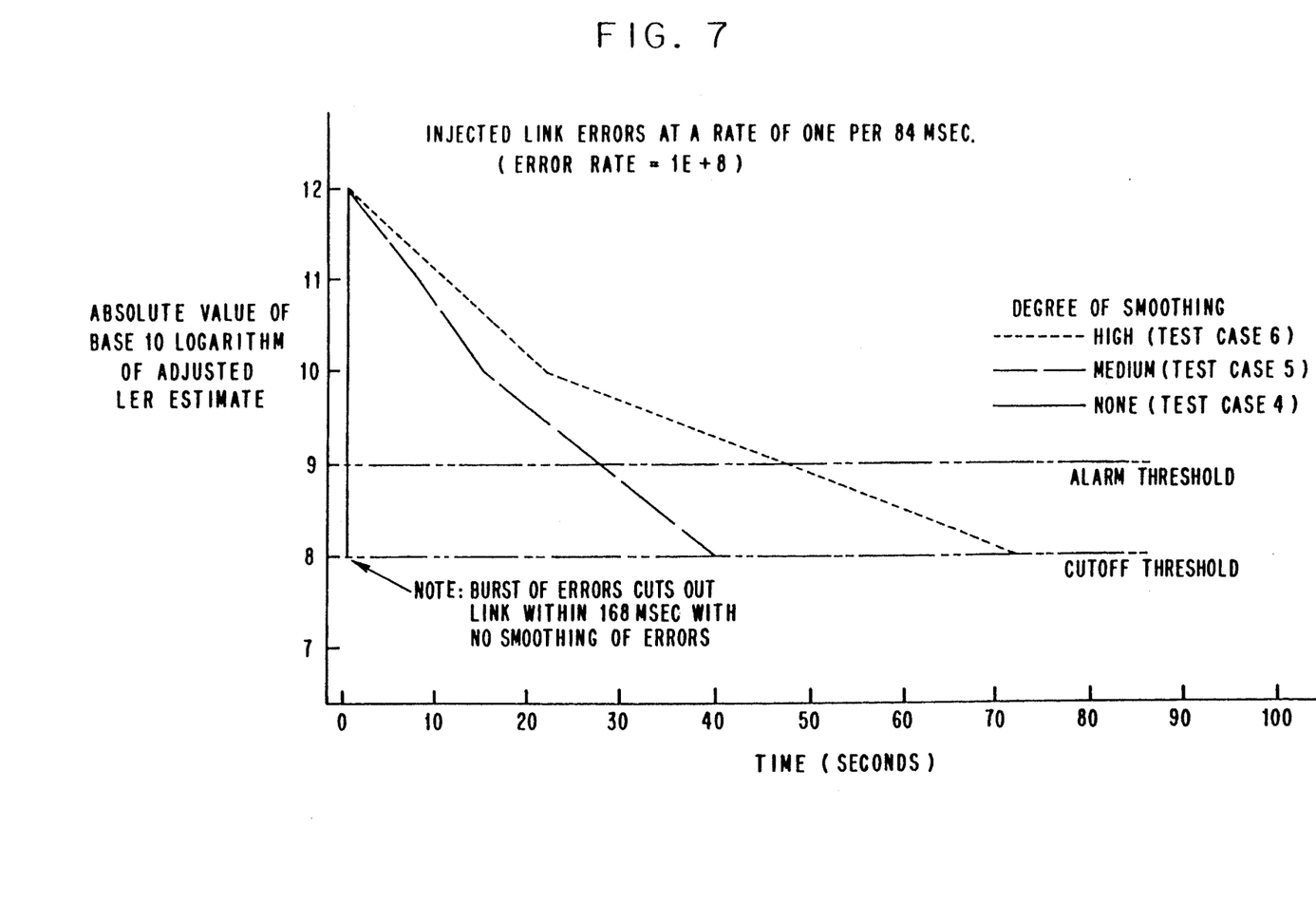
FIG. 7 is a graph of experimental results for a system experiencing a high rate of errors.

Tables 1 through 6 and FIGS. 6 and 7 illustrate experimental examples of several test cases conducted using an enhanced LEM operating according to the present invention. The first column in all of the tables indicates the elapsed time for the running of the test case. The second column indicates the cumulative number of errors detected since the beginning of the experiment (i.e. the LEM Count). The final column represents the value of the Adjusted LER Estimate which was output by the Enhanced LEM. The Adjusted LER Estimate is reported as a base 10 logarithm.

Tables 1, 2 and 3 set forth the experimental results for test cases where there was a low error rate. Errors were injected into the optical link at a rate of one error every 1.3 seconds. This corresponds to an equivalent error rate of one error for every 1E+9 bits transmitted (assuming a 70ns clock rate). The initial LER Estimate for the system was set as a value of 12 for all of the experiments.

TABLE 1

Adjusted LEM Estimate versus Time
No LRF application (Low Error Rate)

| Elapsed Time (minutes) | LEM Count | Adjusted LEM Estimate |
|---|---|---|
| 0 | 0 | 12 |
| 0.022 | 1 | 10 |
| 0.045 | 2 | 9 |
| 1.000* | 42 | 9 |
| 1.400 | 42 | 10 |
| 2.400 | 42 | 11 |
| 16.400** | 42 | 12 |

Notes:
*Generation of errors was stopped here
**LEM Estimate returns back to 12

TABLE 2

Adjusted LEM Estimate versus Time
Medium LRF Applied (Low Error Rate)

| Elapsed Time (Minutes) | LEM Count | Adjusted LEM Estimate |
|---|---|---|
| 0 | 1 | 12 |
| 1.0 | 45 | 11 |
| 2.9 | 130 | 10 |
| 6.4 | 286 | 9 |
| 11.0* | 491 | 9 |
| 11.5 | 491 | 10 |
| 12.5 | 491 | 11 |
| 26.5** | 491 | 12 |

*Generation of errors was stopped here
**LEM Estimate returns back to 12

TABLE 3

Adjusted LEM Estimate versus Time
High LRF Applied (Low Error Rate)

| Elapsed Time (seconds) | LEM Count | Adjusted LEM Estimate |
|---|---|---|
| 0 | 1 | 12 |
| 2.1 | 95 | 11 |
| 5.9 | 266 | 10 |
| 13.0 | 581 | 9 |
| 14.4* | 644 | 9 |
| 14.9 | 644 | 10 |
| 15.9 | 644 | 11 |
| 29.4** | 644 | 12 |

*Generation of errors was stopped here
**LEM Estimate returns back to 12

The data depicted in Table 1 are the results of Test Case 1 which was run with no adjustment, of the LER Estimate being performed by the Enhanced LEM. The results of this test case would be that of a prior art LEM operating without the Adjustment Unit, 330 depicted in FIG. 3. This data serves as a useful comparison of how the present invention will improve management and operation of the LAN links. As seen in Table 1, after 0.045 minutes (2.7 seconds), two errors had been detected by the system and the LER Estimate had reached a value of 9. At the next sample in the experiment, at one minute, 42 errors has accumulated, but the LER Estimate had not dropped below the 9 level. This is because the errors were being injected at a rate which would never cause the LER Estimate to drop below a value of 9. If errors were continually injected at this rate, the LER Estimate would still have remained at a level of 9. At this point in Test Case 1, the injection of errors was stopped, and the LER Estimate rose back to initial level of 12 after a period of approximately 16 minutes. As can be seen in FIG. 6, the graph of the data from Test Case 1 depicts a rather sharp drop in the LER Estimate, a leveling off at an estimate of 9, and then a rise back to the initial value of 12. The significance of Test Case 1 depicted in FIG. 6 will become more apparent in the discussion of the other test cases depicted in that Figure.

Table 2 shows the results of Test Case 2, also run with a low error rate (one error every 1.3 seconds), but in this experiment, the features of the Enhanced LEM were invoked. The LRF used in Test Case 2 was a constant. Recall that the LRF is used in the Adjustment Unit to modify the LER Estimate in order to output the Adjusted LER Estimate. The type of LRF used in this test case, a constant, can be thought of as "weighting" factor. The particular weighting factor used in Test Case 2 was a value of 0.016. This weighting factor resulted in a medium degree of adjustment of the LER Estimate, as opposed the experiments with no adjustment (Test Case 1) and a test case with a high degree of adjustment (Test Case 3). Looking at Table 2 and FIG. 6, it can be seen that the Adjusted LER Estimate in Test Case 2 eventually reached the steady state value of 9 as did the system with no adjustment (Test Case 1). The significant difference between these two test cases, though, is time required to reach this value. In Test Case 2, with a weighting factor of 0.016, the Adjusted LER Estimate took approximately six and one half minutes to reach the steady state level of 9. This is significant as opposed to the 2.7 seconds required reach this same level in the Test Case 1 system with no adjustment. The practical result of adjustment to the LER Estimate will become readily apparent during the discussion of Test Cases 4-6, when an unadjusted LER Estimate would be driven past the Alarm and Cutoff Thresholds.

Test Case 3 was again run with a low rate of errors being injected into the optical link (1/1.3 seconds) and the results have been depicted in Table 3 and on the graph in FIG. 6. As with Test Case 2, a constant LRF (or weighting factor) was used. The difference between this test case and Test Case 2 is that LRF which was used was 0.008, which was half of that used in the previous experiment. The result of this change in the LRF was that it took approximately thirteen minutes for the Adjusted LER Estimate to reach the steady state value of 9 (as opposed to approximately six minutes for a weighting factor of 0.016). These test results have again been illustrated in FIG. 6.

Test Cases 4 through 6 were conducted by injecting a high rate of errors into the optical link. The rate chosen for all of these test cases was one error every eighty four milliseconds. This error rate corresponds to an LER Estimate value of 8 (approximately one error for every 1E+8 bits transmitted, assuming a 70 nanosecond clock). The Alarm and Cutoff Thresholds for these experiments were chosen to be values of 9 and 8 respectively. The test results for these cases can be seen in Tables 4-6 and FIG. 7.

TABLE 4

Adjusted LEM Estimate versus Time
No Adjustment (High Error Rate)

| Elapsed Time (milli-seconds) | LEM Count | Adjusted LEM Estimate |
|---|---|---|
| 0 | 00 | 12 |
| 84 | 01 | 10 |
| 168 | 2 | 8 |

TABLE 5

Adjusted LEM Estimate versus Time
Medium Adjustment (High Error Rate)

| Elapsed Time (seconds) | LEM Count | Adjusted LEM Estimate |
|---|---|---|
| 0 | 1 | 12 |
| 7.82 | 94 | 11 |
| 14.88 | 178 | 10 |
| 27.24 | 325 | 9 |
| 40.02 | 477 | 8 |

TABLE 6

Adjusted LEM Estimate versus Time
High Adjustment (High Error Rate)

| Elapsed Time (seconds) | LEM Count | Adjusted LEM Estimate |
|---|---|---|
| 0 | 1 | 12 |
| 7.9 | 95 | 11 |
| 22.1 | 264 | 10 |
| 46.9 | 559 | 9 |
| 72.6 | 865 | 8 |

Test Case 4 (like Test Case 1) was conducted with no adjustment to the LER Estimate (i.e. the LRF constant was =1.00). This test case, again, corresponds to the results which would be seen in a prior art LEM without the advantages of the present invention. The solid line in FIG. 7 is a graph of the base ten logarithm of the LER Estimate output in Test Case 4 as a function of time. As can be seen graphically in this Figure, without any adjustment to the LER Estimate, the burst errors during this experiment quickly drive the LER Estimate beyond both the Alarm and Cutoff Thresholds. Without the use of the present invention, the station experiencing these errors would have dropped the link (exceeded the Cutoff Threshold) within 168 milliseconds.

In Test Case 5, a medium degree of adjustment was chosen for application to the LER Estimate in the Adjustment Unit (the LRF was 0.016). As can be seen from the graph of this test case depicted in FIG. 7, the Adjusted LER Estimate took approximately twenty seven seconds to exceed the Alarm Threshold and an additional thirteen seconds to exceed the Cutoff Threshold. The comparison of this test case to that of Test Case 4 dramatically illustrates some of the advantages of the present invention. In the prior art systems (Test Case 4), the link experiencing the burst errors being simulated in these test cases would have been dropped in less than one second. Through the use of the enhanced LEM of the present invention, the station was able to withstand the burst errors well past the one second mark (for an additional thirteen seconds to be exact). In most LAN systems, burst errors would not last as long as thirteen seconds as experienced during this experiment, but Test Case 5 illustrates how utilization of the Enhanced LEM will allow a station to "ride out" burst errors without resorting to the termination of the link. Of course the data which was being transmitted during the burst errors will have to be discarded and retransmitted, but this process is significantly less time consuming than terminating and reestablishing the link, and then retransmitting the data.

A weighting factor which produced a high degree of adjustment was used in Test Case 6. As with Test Case 3, the LRF chosen for this experiment was a constant, 0.008. Looking at FIG. 7, it can be seen that it took approximately forty seven seconds for the Adjusted LER Estimate to reach the Alarm Threshold and an additional 17 seconds to exceed the Cutoff Threshold. This test case illustrates the increased degree of adjustment which can be chosen to tailor the responsiveness of a particular link. After a review of the graphs in FIG. 7, it can be appreciated that for the higher degree of adjustment chosen, the trade-off is the responsiveness of the link to errors. For example, one particular link in the LAN might expect, and be able to withstand, burst errors for the length of time depicted for Test Case 6 and the LRF can be set accordingly. But for another link in the LAN, it is known that burst errors of such a duration indicate that there is some sort of serious hardware problem in the link. For such a link, a medium degree of adjustment, such as that depicted in Test Case 5 should be chosen.

It further can be appreciated from the graphs depicted in FIG. 7 that virtually any type of LRF can be used to adjust the LER Estimate. The experiments run in all of the tests cases depicted here were chosen to use a constant LRF. Alternatively, the LRF, or a permanent system in the Adjustment Unit, can be an algorithm, a series of algorithms, a feedback function, some sort of artificial intelligence entity or a neural network system for example. An example of a simple algorithm would be to apply a constant LRF for medium adjustment before the Adjusted LER Estimate exceeded the Alarm Threshold and to apply a second constant LRF for high adjustment after the Alarm Threshold has been exceeded. Such an algorithm would be desirable in a link where the operator wants to be informed early about potential problems on a link, but does not want the link to be terminated as quickly.

While particular embodiments of the present invention have been shown and described, it will be understood by those skilled in the art that modifications may be made to a particular embodiment without departing from the true spirit and scope of the present invention.

We claim:

1. A method of managing link errors in a Local Area Network (LAN), said LAN having a plurality of nodes communicating by physical links connecting said nodes, said method comprising:
   detecting occurrences of said errors on at least one of said links;
   calculating a Link Error Rate (LER) estimate based upon said occurrences of said errors on said link, said LER estimate being a function of time;
   adjusting said LER estimate according to a link specific characteristic function;
   comparing said adjusted LER estimate to a link error rate thresholds; and
   outputting a decision based upon said comparison.

2. A method according to claim 1 further comprising:
   altering said link specific characteristic function prior to its use in adjusting said LER estimate.

3. A method according to claim 2 wherein said alteration is performed by a LAN management entity, said LAN management entity being remote from said plurality of said nodes.

4. A method according to claim 3 wherein said link specific characteristic function is denoted as a Link Responsiveness Factor (LRF), a unique LRF residing in storage in each of said plurality of nodes.

5. A method according to claim 4 wherein said detecting, calculating, adjusting, comparing and outputting steps are performed in each of said plurality of nodes in said LAN.

6. A method according to claim 5 Further comprising:
   receiving said decisions at said LAN management entity,
   developing new unique LRFs for said plurality of nodes based upon a history of said received decisions.

7. An apparatus for managing link errors in a Local Area Network (LAN), said LAN having a plurality of nodes communicating by physical links connecting said nodes, said apparatus comprising:
   a means for detecting occurrences of said errors on at least one of said links, said detection means having an indication of said errors as an output;
   a means for determining a Link Error Rate (LER) estimate, said determining means having as an input said output of said detecting means, said LER estimate estimating said link errors as a function of time;
   a means for adjusting said LER estimate according to a link specific characteristic function;
   a means for comparing said adjusted LER estimate to a link error rate thresholds; and
   a means for outputting a decision based upon said comparison from said comparison means.

8. An apparatus as described in claim 7 wherein detecting, determining, adjusting, comparing and outputting means are each contained in each of said plurality of nodes in said LAN.

9. An apparatus as described in claim 8 further comprising a means for altering said link specific characteristic function.

10. An apparatus as described ill claim 9 wherein said altering means is contained in each of said nodes in said LAN.

11. An apparatus as described in claim 9 wherein:
    said altering means is located remotely from said LAN;
    one of said nodes of said LAN acting as a proxy agent for said remote altering means, said remote altering means communicating with said nodes of said LAN through said proxy agent.

12. An apparatus for managing link errors in a Local Area Network (LAN), said LAN having a plurality of nodes communicating by physical links connecting said nodes, said apparatus comprising:
    error detectors monitoring said physical links of said LAN, an output of said error detectors being an indication of errors on said physical links;
    an Estimating Unit, said Estimating Unit receiving said indication of said errors, said Estimating Unit determining a Link Error Rate (LER) estimate, said LER estimate being an estimate of the rate of said link errors as a function of time;
    an Adjustment Unit, said Adjustment Unit receiving said LER estimate as an input, said Adjustment unit applying a link specific characteristic function to said LER estimate, said Adjustment Unit outputting an adjusted LER estimate; and
    a Decision Unit, said Decision Unit receiving said adjusted LER estimate and comparing it to link error rate thresholds, said Decision unit outputting a decision, based upon said comparison, as to what action is necessary with respect to said physical links.

13. An apparatus according to claim 12 further comprising:

an Accumulator, said accumulator receiving and keeping track of said indication of said errors from said error detectors, said Accumulator making said indications available to said Estimator Unit;

14. An apparatus according to claim 12 wherein:

said link error rate thresholds are an alarm threshold and a cutoff threshold;

said Decision Unit's outputted decision being to issue an alarm if said adjusted LER estimate exceeds said alarm threshold; and said Decision Unit's outputted decision being to terminate said link connection if said adjusted LER estimate exceeds said cutoff threshold;

15. An apparatus according to claim 14 further comprising:

an alarm generator, said alarm generator generating an alarm in response to said alarm decision from said Decision Unit; and a link connection terminator, said link terminator, terminating said link connection in response to said termination decision from said Decision Unit.

16. An apparatus according to claim 12 further comprising:

a LAN Manager Unit, said LAN Manager Unit being located remotely from said LAN, said LAN Manager Unit communicating with said nodes of said LAN through one of said nodes acting as a proxy agent; and said LAN Manager Unit supplying said link specific characteristic functions to each of said nodes.

* * * * *